United States Patent

Larkin

[15] 3,639,970
[45] Feb. 8, 1972

[54] METHOD AND APPARATUS FOR FORMING PLASTIC-LINED METAL CONDUIT

[72] Inventor: Mark E. Larkin, Bartlesville, Okla.
[73] Assignee: Phillips Petroleum Company
[22] Filed: Oct. 2, 1969
[21] Appl. No.: 863,198

[52] U.S. Cl. .......................29/411, 29/33 D, 29/474.1, 29/477.7, 138/151, 264/176, 285/55
[51] Int. Cl. .......................................................B23p 17/00
[58] Field of Search............29/429, 474.1, 411, 33.4, 33 D, 29/477.7, 417; 138/137, 140, 151, 158; 264/176; 285/55; 18/13 H, 13 P

[56] References Cited

UNITED STATES PATENTS

| | | |
|---|---|---|
| 284,794 | 9/1883 | Allen....................................138/140 |
| 2,126,453 | 8/1938 | Criley et al........................29/417 UX |
| 2,888,954 | 6/1959 | Gates....................................138/137 |
| 3,069,763 | 12/1962 | Reynolds ..........................29/477.7 X |
| 3,168,910 | 2/1965 | Galloway et al. ......................138/137 |

Primary Examiner—Charlie T. Moon
Attorney—Young and Quigg

[57] ABSTRACT

An apparatus for continuously forming a metal and plastic composite conduit having a metallic outer surface, cutting portions from the continuously formed conduit, and ejecting the cutoff portions from the apparatus.

3 Claims, 3 Drawing Figures

PATENTED FEB 8 1972

3,639,970

INVENTOR.
M. E. LARKIN
BY Young & Quigg
ATTORNEYS

METHOD AND APPARATUS FOR FORMING PLASTIC-LINED METAL CONDUIT

This invention relates to an apparatus for forming a composite metal and plastic conduit having a metallic outer surface and a plastic inner surface. In another aspect, this invention relates to an apparatus for continuously forming a composite metal and plastic conduit from an extruded plastic tube and a flat metallic tape.

Plastic-lined tubing or conduit is principally formed by one of two methods. In the first method, metallic conduit is internally coated by rolling or spraying a plastic film onto the inner surface. The coating is thereafter cured by heating to high temperatures or by other means known in the art. The resultant composite conduit generally has the disadvantages of being easily damaged owing to the relative thinness of the plastic, poorly adapted to subsequent insertions of metal objects into the conduit in contact with the plastic, and often incompletely coated over the inner surface. In the second method relatively short lengths of plastic tubing are inserted into a metallic conduit to form a composite metallic and plastic conduit. Owing to the fact that the plastic tubing to be inserted must be considerably smaller in outside diameter than the inside diameter of the metallic conduit to prevent undue friction during the insertion operations, the resultant parts of the composite conduit are not satisfactorily maintained together to form an integral conduit. Slippage of the plastic tubing within the metal conduit can damage the plastic or allow leakage of corrosive fluids past the plastic conduit. The frictional forces generated during plastic tubing insertion also limits the maximum length of the composite conduit and often causes damage to the plastic tubing and waste.

Both of the principal methods of forming a composite metallic and plastic conduit require a great deal of labor and supervision, result in large amounts of waste, are limited to producing short length conduits, and comprise a plastic inner shell that is of less than desirable durability.

It is therefore an object of this invention to provide an apparatus for constructing an improved composite metallic and plastic conduit. Another object is to provide an apparatus for forming a continuous conduit of the above-described type. Yet another object of this invention is to provide an apparatus that will automatically, continuously produce composite conduit of the above-described type with the utilization of less supervision and with decreased waste. A further object of this invention is to provide an apparatus for producing a plurality of composite conduits of the above-described type, each having a preselected length. Other aspects, objects, and advantages of the present invention will become apparent from a study of the disclosure, the appended claims, and the drawing.

The drawings are diagrammatic views of the apparatus of this invention.

Figure 1:
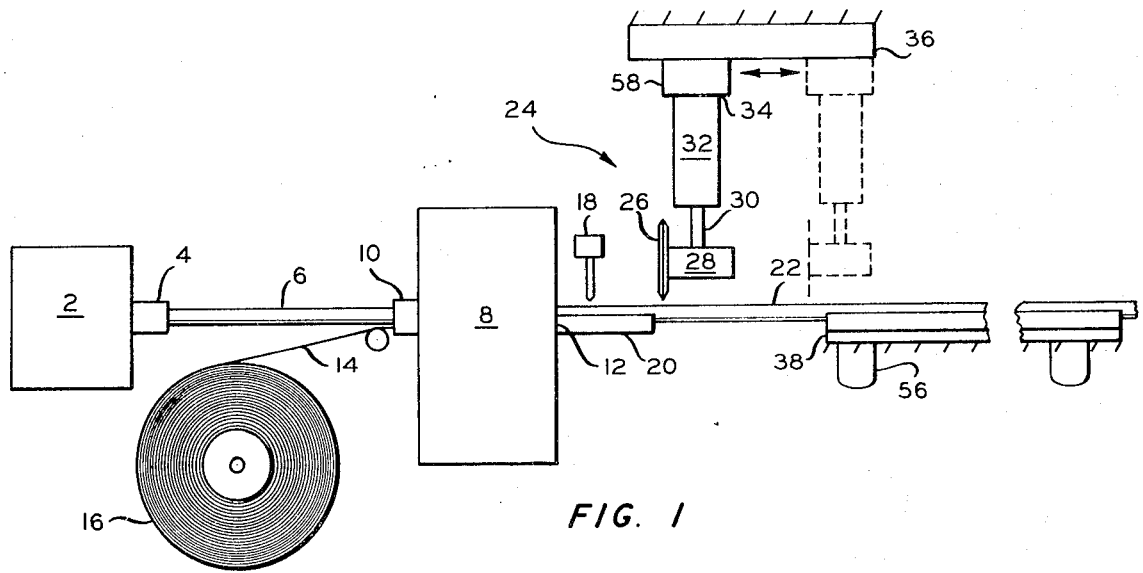
FIG. 1 is a diagrammatic front view of the apparatus of this invention.

FIG. 1 shows a conventional plastic extruder 2 having a die 4 for forming a plastic conduit 6. A metal conduit former 8 is positioned in the pathway of the plastic conduit issuing from the extruder 2 and preferably spaced a distance from said extruder 2 to provide for cooling of the plastic conduit 6. The conduit former 8 has inlet and outlet ends 10, 12. Plastic conduit 6 issuing from the extruder 2 and continuous metallic tape 14 issuing from a tape reservoir 16 enter the inlet end 10 of the conduit former 8, pass through the former 8, and discharge from the outlet end 12 of said former 8. A sealing means 18 such as soldering apparatus, adhesive-applicating apparatus, metal-crimping apparatus, or the like, is positioned adjacent the outlet end 12 of the former 8 and the abutting edges of the tape 14 in the encompassing position of the tape about the plastic conduit for continuously sealing the edges of the tape 14.

It is preferred that the sealing means be positioned as near as practical to the outlet end 12 of the former 8. If the sealing means is too far removed from the outlet end 12 of the former 8 the abutting edges tend to spring back toward their original flat position thereby permitting the edges of the tape 14 to become spaced one from the other and result in a seal of reduced quality. A support means 20 is preferably positioned adjacent the outlet end 12 of the former 8 to maintain the composite conduit 22 issuing therefrom against lateral movement.

A cutter 24 having a cutter element 26 is positioned adjacent the sealing means 18 for cutting the composite conduit 22 at preselected locations. The cutting element 26 is preferably a rotating circular saw driven by an electric motor 28. The cutting element 26 is attached to a first end 30 of a power means 32, preferably a hydraulic cylinder, for moving the cutting element in a transverse direction relative to the composite conduit 22. The power means 32 is attached at the second end 34 to a track 36 for longitudinal movement of the cutting element 26 along the longitudinal axis of the composite conduit 22. A conveying means 38 is positioned adjacent the cutting elements 26 for receiving the composite conduit 22 and maintaining said conduit 22 against lateral movement.

Figure 2:
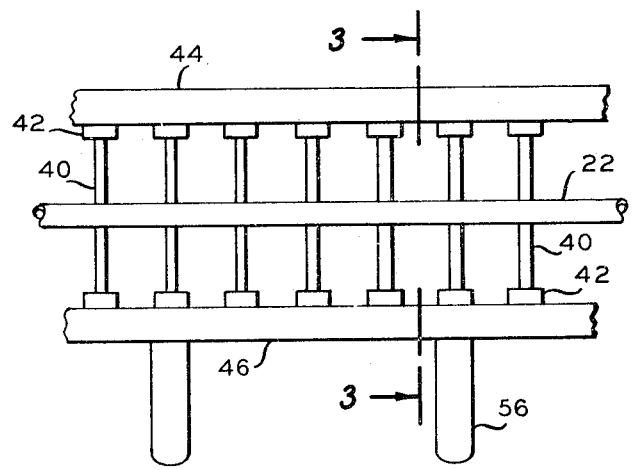
FIG. 2 is a plan view of a portion of the conveying means of the apparatus.
Figure 3:
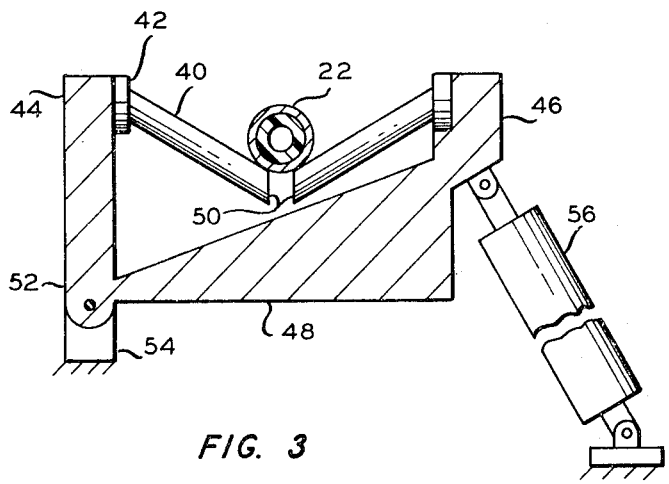
FIG. 3 is a sectional view of the conveying means taken along line 3—3 of FIG. 2.

Referring to FIGS. 2 and 3, conveying means 38 has a plurality of opposed, downwardly and inwardly extending rollers 40, each attached by a separate bearing 42 to the respective first and second sides 44, 46 of a supporting frame 48 of the conveying means 38. The inward ends 50 of the rollers 40 terminate adjacent one another at a position lower in elevation than the composite conduit 22 issuing from the former 8 and the roller bearings 42 thereby forming a V-shaped supporting structure for the composite conduit 22. By so constructing a V-shaped conveying means, lateral movement of the composite conduit 22 is prevented by impingement of the rollers upon said conduit 22.

In order to provide for movement of a cutoff section of composite conduit 22 from the apparatus for further handling, it is preferred that the conduit section be moved laterally, thereby conserving space. In order to accomplish lateral movement of a conduit from the conveying means the lower end 52 of the first side 44 of the frame 48 is pivotally attached to a fixed structure 54. The second side 46 of the frame 48 is attached to a power source 56, preferably a hydraulic cylinder, for pivoting the conveying means 38 between a first position at which the frame 48 and associated roller 40 are supporting the conduit 22 and a second position at which the frame 48 and roller 40 are inclined relative to the first position.

In the operation of this invention, a plastic conduit continuously issues from the die 4 of the extruder 2 and passes into the conduit former 8. Within the former 8 a flat continuous metallic tape 14 is deflected to entirely encompass the plastic conduit 6. Although it is preferred that the plastic conduit 6 and the composite conduit 22 be of a round tubular shape, other shaped conduits such as square, rectangular, triangular, etc., can be formed with the apparatus of this invention. In order to provide a relatively smooth, fluidtight seal it is also preferred that the conduit former 8 wraps the metallic tape about the plastic conduit with the edges of the tape in abutting relationship thereby forming a longitudinal seam. Conduit forms which crimp or fold the edges into fixed contact one with the other can also be used in this invention.

As the metallic tape 14 is continuously attached to the plastic conduit, the resulting composite conduit 22 continuously moves outwardly from the former 8 adjacent the cutter 24. After a preselected length of the composite conduit 22 has been formed and portions thereof have been extended onto the conveying means 38 in supporting relationship relative thereto, the electric motor 28 is actuated to energize the cutting element 26 and the power source 56 is actuated to transversely move the cutting element from a first position at which the cutting element 26 is spaced from the conduit 22 to a second position at which a portion of the cutting element 26 extends traversely through and beyond the conduit 22 thereby cutting a portion of the conduit 22 from the continuously forming conduit. During movement of the cutting element 26 from the first to the second position, the power source 32 and associated electric motor 28 and cutting element 26 are moved along the track 36 preferably by a separate electric motor 58. The cutting element is moved along the track in a pathway parallel to the conduit and in the same direction and at the same rate of the travel that said conduit 22 is moving relative to the conduit former 8. The separate electric motor 58 is preferred for movement of the cutter 24 along the track 36 in order to assure that increased power requirements from cutting the conduit do not influence the rate of travel of the cutter 24. It is necessary that the cutter move longitudinally relative to the conduit 22 being cut in order that the cutting element 26 does not bind within the cut and that the apparatus can continuously form conduit during cutting of the conduit into preselected lengths. After cutting of the conduit 22 the electric motor 28 associated with the cutting means is deenergized, the power means 32 moves the cutting element in an opposed direction, and the electric motor 58 returns the cutter 24 along the track 36 for the initiation of a new cycle. After severance of a portion of the composite conduit 22 by the cutting element 26, the power source 56 of the frame 48 pivots the frame 48 to discharge the severed conduit portion and returns said frame 48 for receiving conduit 22 issuing from the former 8.

It should be understood that the preferred cutting means described above for severing the moving conduit can be of other construction without departing from this invention. Other modifications and alterations of this invention will become apparent to those skilled in the art from the foregoing discussion and accompanying drawing, and it should be understood that this invention is not to be unduly limited thereto.

What is claimed is:

1. An apparatus for forming a composite metal and plastic conduit having a metal outer surface and a plastic inner surface, comprising:

an extruder having a die for continuously extruding a plastic conduit;
    a metal conduit former having inlet and outlet ends positioned in the pathway of the plastic conduit issuing from the extruder for continuously receiving a metallic tape and the plastic conduit from the extruder, wrapping the metallic tape about the entire outer surface of said plastic conduit to produce abutting tape edges, and sealing said abutting edges of the metallic tape;
    a cutter having a cutting element and being positioned adjacent the outlet end of the metal conduit former and being intermittently movable relative to the conduit issuing from said conduit former for cutting the conduit at preselected intervals;
    a plurality of opposed downwardly and inwardly extending rollers positioned at a lower elevation from the cutter for maintaining the conduit from lateral movement during cutting operations;
    a movable frame attached to the plurality of rollers, said frame and associated rollers being movable between a first position at which the frame and rollers are supporting the conduit and a second position at which the frame and rollers are inclined relative to the first position for discharging the conduit from the rollers; and
    power means attached to the frame for moving the frame from the first to the second position in response to cutting of the conduit.

2. An apparatus, as set forth in claim 1, wherein the metal conduit former wraps the metal tape about the plastic conduit with edges of the tape in abutting relationship and a sealing means positioned adjacent the outlet of the conduit former and adjacent the abutting edges of the tape for continuously sealing the edges of the tape one to the other.

3. A method for forming a composite metal and plastic conduit having a metal outer surface and a plastic inner surface, comprising:

extruding a plastic conduit from an extruder;
    passing the plastic conduit into a metal conduit former;
    deflecting a metallic tape about the outer surface of the conduit with the edges of said tape in abutting relationship and sealing said abutting edges to form a composite conduit;
    intermittently cutting in two the continuous composite conduit; and
    ejecting the cutoff portion of the conduit from the pathway of the continuously forming composite conduit.

* * * * *